(12) United States Patent
Horwood et al.

(10) Patent No.: US 12,043,381 B2
(45) Date of Patent: Jul. 23, 2024

(54) PIN JOINT ASSEMBLY

(71) Applicant: AIRBUS OPERATIONS LIMITED, Bristol (GB)

(72) Inventors: Jack Horwood, Bath (GB); Matt Harding, Bath (GB); Paul Morrell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 300 days.

(21) Appl. No.: 17/507,577

(22) Filed: Oct. 21, 2021

(65) Prior Publication Data

US 2022/0194549 A1 Jun. 23, 2022

(30) Foreign Application Priority Data

Dec. 21, 2020 (GB) ..................................... 2020299

(51) Int. Cl.
*B64C 3/48* (2006.01)
*F16B 19/00* (2006.01)
(Continued)

(52) U.S. Cl.
CPC .............. *B64C 3/48* (2013.01); *F16B 19/002* (2013.01); *F16B 19/02* (2013.01); *F16C 11/02* (2013.01);
(Continued)

(58) Field of Classification Search
CPC .... B64C 3/48; B64C 9/02; B64C 3/38; B64C 9/16; B64C 9/22; F16B 19/002;
(Continued)

(56) References Cited

U.S. PATENT DOCUMENTS 3,499,183 A   3/1970  Parsons
3,980,321 A * 9/1976 Hamilton .............. E02F 3/6454
                                                    280/515
(Continued)

FOREIGN PATENT DOCUMENTS

CA    2 894 972     7/2014
CN    205349050     6/2016
(Continued)

OTHER PUBLICATIONS

Combined Search and Examination Report for GB2020299.0 dated May 26, 2021, 7 pages.
(Continued)

*Primary Examiner* — David M Upchurch
(74) *Attorney, Agent, or Firm* — Nixon & Vanderhye P.C.

(57) ABSTRACT

A pin joint assembly including: a first end lug and a second end lug; a pin hole extending through the first and second end lugs; a first retaining feature and a second retaining feature arrangeable at opposing ends of the pin hole; a headless pin including a pin body for inserting through the pin hole to rotatably couple the first and second end lugs, such that the pin body is retained between the first and second retaining features; a first bushing for positioning between the headless pin and the first end lug, and a second bushing for positioning between the headless pin and the second end lug; wherein the headless pin is isolated from the first and second retaining features.

21 Claims, 5 Drawing Sheets

(51) Int. Cl.
*F16B 19/02* (2006.01)
*F16C 11/02* (2006.01)
*F16C 11/04* (2006.01)
*F16C 25/04* (2006.01)

(52) U.S. Cl.
CPC ............ *F16C 11/045* (2013.01); *F16C 25/04* (2013.01); *F16C 2326/43* (2013.01)

(58) Field of Classification Search
CPC .......... F16B 19/02; F16B 21/12; F16C 11/02; F16C 11/045; F16C 25/04; F16C 2326/43; F16C 33/04; F16C 43/02; F16C 35/02
See application file for complete search history.

(56) References Cited

U.S. PATENT DOCUMENTS

| | | | |
|---|---|---|---|
| 4,913,577 A * | 4/1990 | Forslund | F16C 11/045 403/16 |
| 5,599,056 A | 2/1997 | Schmitt | |
| 9,321,522 B2 | 4/2016 | Blades | |
| 11,215,219 B2 * | 1/2022 | Stumpp | F16C 33/08 |
| 2015/0167726 A1 * | 6/2015 | Cassagne | B64D 27/26 411/136 |
| 2019/0308739 A1 * | 10/2019 | Messina | F16C 11/10 |

FOREIGN PATENT DOCUMENTS

| | | |
|---|---|---|
| DE | 202011107851 | 2/2012 |
| EP | 1 721 054 | 11/2006 |
| EP | 2586700 | 5/2013 |
| EP | 3 553 331 A1 | 10/2019 |
| GB | 2290346 | 12/1995 |
| GB | 2463116 | 3/2010 |
| RU | 2018 144 878 | 6/2020 |
| WO | 2005/026484 | 3/2005 |

OTHER PUBLICATIONS

European Search Report cited in EP 21203302.1, mailed Apr. 4, 2022, 8 pages.

* cited by examiner

PIN JOINT ASSEMBLY

RELATED APPLICATION

This application claims priority to and incorporates by reference United Kingdom patent application GB 2020299.0, filed Dec. 21, 2020

FIELD OF THE INVENTION

The present invention relates to a pin joint assembly, an aircraft assembly comprising the pin joint assembly, and a method of assembling the pin joint assembly.

BACKGROUND OF THE INVENTION

The internal space available for components and systems within an aircraft is typically restricted, particularly in the wings where structural and aerodynamic considerations are paramount. However, the assembly of pin joints requires a respectively large clearance space in which to manoeuvre the pin so that it can be aligned into the final assembly position to form the pin joint.

Consequently, the assembly or disassembly of a pin joint can be impeded by other unrelated components, requiring the disassembly of multiple components in order to assemble or disassemble the pin joint. This can be time consuming and costly.

SUMMARY OF THE INVENTION

A first aspect of the invention provides a pin joint assembly comprising: a first end lug and a second end lug; a pin hole extending through the first and second end lugs; a first retaining feature and a second retaining feature arrangeable at opposing ends of the pin hole; a headless pin comprising a pin body for inserting through the pin hole to rotatably couple the first and second end lugs, such that the pin body is retained between the first and second retaining features; a first bushing for positioning between the headless pin and the first end lug, and a second bushing for positioning between the headless pin and the second end lug; wherein the headless pin is isolated from the first and second retaining features.

There are a number of advantages associated with a pin joint in which the pin is isolated from the retaining features. Firstly, the length of the pin and retention features may be reduced compared to a traditional hinge pin design in which the retention features clamp the headed pin to the end lugs of the pin joint. As a result, the pin joint restores the available space for systems and structures.

Secondly, the assembly direction is independent of retaining features. This allows plug and play functionality of jointed components, e.g. a wing tip, without having to break down non-related systems. Similarly assembly sequencing is independent of the pin orientation.

Thirdly, the tolerance stack associated with this innovation is shorter and has fewer contributors than the existing pin joint design. This can reduce the required tolerance of each component and sub-assembly in the design.

Optionally, the first retaining feature is fixed to the first bushing and/or the second retaining feature is fixed to the second bushing.

Optionally, the second retaining feature is integral with the second bushing.

Optionally, the pin body is rotatable with respect to both the first and second end lugs.

Optionally, the headless pin comprises a first pin end portion at a first end of the pin body, and the first pin end portion is configured to pass through an aperture formed in the first retaining feature and a first pin retainer is configured to attach to the first pin end portion to retain the first retaining feature between the first pin retainer and the pin body.

Optionally, the headless pin comprises a second pin end portion at a second end of the pin body, and wherein the second pin end portion is configured to pass through an aperture formed in the second retaining feature and a second pin retainer is configured to attach to the second pin end portion to retain the second retaining feature between the second pin retainer and the pin body.

Optionally, the first and/or second pin retainer is a locking pin or a split pin.

Optionally, the first pin end portion and second pin end portion are integrally formed with the pin body.

Optionally, the first retaining feature is a locking bushing cap configured to fixedly attach to the first bushing and/or the second retaining feature is a locking bushing cap configured to fixedly attach to the second bushing.

Optionally, the pin joint comprises one or more intermediate lugs between the first and second end lugs, wherein the pin hole extends through the one or more intermediate lugs.

Optionally, at least two of the first end lug, second end lug, and one or more intermediate lugs extend from a common component.

A second aspect of the invention provides an aircraft assembly comprising the pin joint of the first aspect, a first aircraft component, and a second aircraft component, wherein the first end lug extends from one of the first or second aircraft components and the second lug extends from one of the first or second aircraft components, such that the first aircraft component is arranged to rotate relative to the second aircraft component about an axis of the pin joint assembly.

Optionally, the first aircraft component is a main wing portion of a wing and the second aircraft component is a wing tip device.

Optionally, the first aircraft component is a main wing portion of a wing and the second aircraft component is a flight control surface.

Optionally, the flight control surface is one of: an aileron, a slat, a spoiler, and a flap.

Optionally, the aircraft assembly comprises an obstruction arranged at an obstructed end of the pin hole. With this arrangement, an obstruction blocks one end of the pin hole such that the pin needs to be inserted via an unobstructed end opposing the obstructed end. Otherwise, the obstruction needs to be removed before inserting the pin.

Optionally, the obstruction is an actuator for rotating the second aircraft component relative to the first aircraft component.

Optionally, the pin joint assembly is a first pin joint assembly, and there is provided a second pin joint assembly, wherein the obstruction is arranged at the obstructed end of the first pin joint assembly and at an obstructed end of the second pin joint assembly.

A further aspect of the invention provides an aircraft comprising the aircraft assembly of the second aspect.

A further aspect of the invention provides a method of assembling the pin joint assembly of the first aspect, comprising: inserting the headless pin into an open end of the pin hole that opposes an obstructed end.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
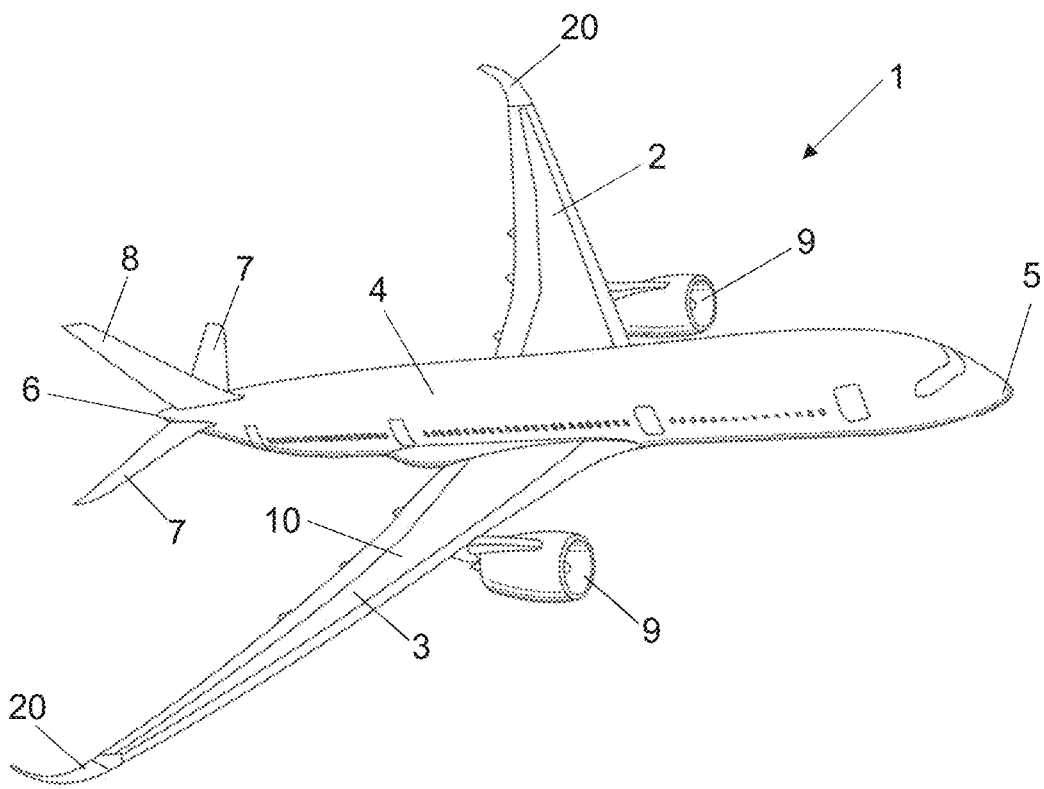
FIG. 1 shows a perspective view of a typical fixed wing aircraft.

FIG. 1 illustrates a typical fixed wing aircraft 1. The aircraft 1 may have a port wing 2 and a starboard wing 3 that extend from a fuselage 4. Each wing 2, 3 may carry wing mounted engines 9. The fuselage 4 has a nose 5 and a tail 6. The tail 6 may have horizontal and vertical stabiliser surfaces 7, 8. The aircraft 1 may be a typical jet passenger transport aircraft although the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 may have a main wing portion 10 that is a cantilevered structure with a length extending in a span-wise direction from a wing root to a wing tip, the root being joined to the aircraft fuselage 4. A wing tip device 20 may be provided on the tip end of each wing 2, 3. The wings 2, 3 are similar in construction so only the starboard wing 3 will be described in detail with reference to FIG. 2.

Figure 2:
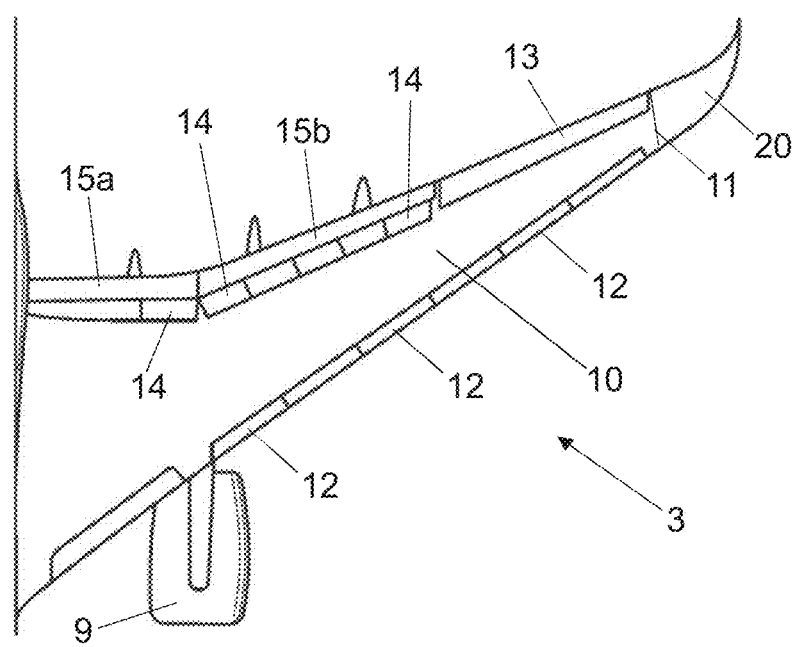
FIG. 2 shows a planform view of a port side wing.

The wing 3 may have a plurality of flight control surfaces. The wing 3 may include slats 12. FIG. 2 shows slats 12 adjacent the leading edge of the wing 3. A plurality of slats 12 may be distributed along the span of the wing 3. The wing 3 may include an aileron 13. FIG. 2 shows an aileron 13 provided on an outboard section of the trailing edge of the wing 3. The wing 3 may include air brakes/spoilers 14. FIG. 2 shows air brakes/spoilers 14 provided across the upper surface of the wing 3 towards the trailing edge of the wing 3. The wing 3 may include a flap 15. FIG. 2 shows an inner flap 15a adjacent to the wing root, and an outer flap 15b outboard of the inner flap towards the aileron 13.

Whilst the aircraft 1 is shown with a particular quantity and configuration of control surfaces, it will be understood that the wings 2, 3 may comprise a different number and/or arrangement of control surfaces.

The wing tip device 20 may be a folding wing tip device 20 configured to rotate relative to the wing 3 about a fold axis 11. The fold axis 11 may extend from a leading edge to a trailing edge of the wing 3. The folding wing tip device 20 may be rotated relative to the wing 3 by an actuator 50.

Figure 3:
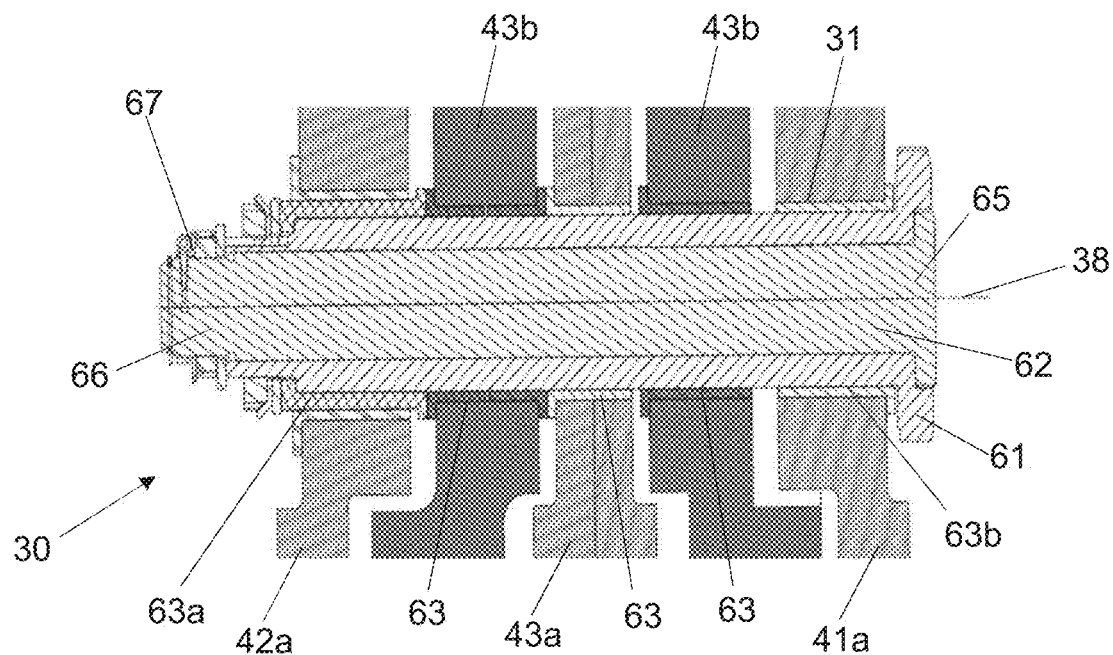
FIG. 3 shows a pin joint assembly of the prior art.

FIG. 3 shows an existing folding wing tip mechanism according to an example of the prior art. The mechanism includes a pin joint assembly 30. The pin joint assembly 30 comprises a first end lug 41a and a second end lug 42a. The first end lug 41a and the second end lug 41a comprise a pin hole 31 that extends through the first and second end lugs 41a, 42a.

The pin joint assembly 30 includes a series of lugs 41a, 42a, 43a extending from the tip end of the wing 3 and a series of lugs 43b extending from a root end of the wing tip device 20.

The lugs 41a, 42a, 43a, 43b include a pin hole 31 extending therethrough, and through which a headed pin 62 is inserted. The headed pin 62 is inserted into a pin sleeve 61. A set of bushings 63, 63a, 63b are arranged between the pin sleeve 61 and each lug 41a, 42a, 43a, 43b to reduce the friction between the relative parts when the wing tip device 20 folds relative to the wing 3.

The headed pin 62 has a head end 65 and a tail end 66. The head end 65 has a diameter larger than the pin hole 31 and headed pin 62, such that the headed pin 62 is prevented from being fully inserted into the pin hole 31. The tail end 66 includes a set of locking features 67 (for example locking nuts) that tighten the towards the head end 65, thereby pressing the headed pin 62 against the end bushings 63a, 63b of the end lugs 41a, 42a. FIG. 3 shows the headed pin 62 pressing against the end bushings 63a, 63b of the wing lugs 41a, 42a, although alternatively the end lugs may be wing tip lugs. This clamping arrangement substantially prevents relative movement between the pin sleeve 61 and the end bushing 63a, whilst allowing relative movement between the wing tip lugs 43b and the headed pin 62.

Figure 4:
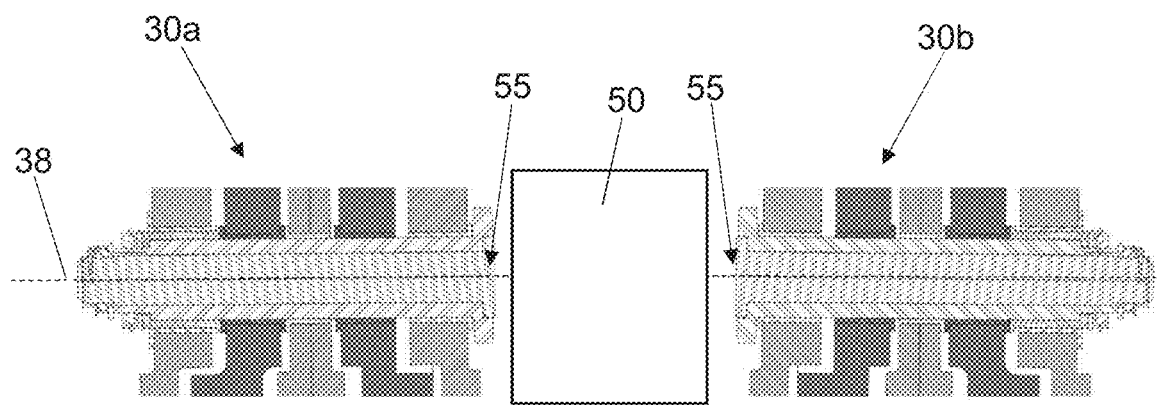
FIG. 4 shows an aircraft assembly including a pair of pin joint assemblies of the prior art.

FIG. 4 schematically shows an actuator 50 positioned between a pair of pin assemblies 30: a first pin joint assembly 30a adjacent a trailing edge of the wing 3 and a second pin joint assembly 30b adjacent the leading edge of the wing 3. The headed pins 62 of each assembly 30a, 30b each have a pin axis 38 aligned with the fold axis 11 of the wing tip device 20.

There is limited space within the wing structure to house the folding wing tip mechanism. Due to the limited space within the wing structure, the actuator 50 fills a substantial amount of the space between the two pin joint assemblies 30a, 30b. As a result, due to the size of the stack of locking features 67 on the headed pin 62 occupying a large amount of axial space, the headed pins 62 are arranged with the pin heads 65 of each headed pin 62 facing inwards towards the actuator 50 with the tail end 66 facing outwards away from the actuator 50. If the headed pins 62 were reversed, such that the pin heads 65 of each headed pin 62 faced outwards towards the actuator 50 and the tail end 66 faced inwards away from the actuator 50, there would be insufficient space to fit the actuator between the pin assemblies 30a, 30b due to the size of the set of locking features 67.

The actuator 50 is positioned adjacent the head end 65 of each headed pin 62, such that when the actuator 50 is assembled the actuator 50 prevents the removal of the headed pins 62 from the pin holes 31 and thereby creates an obstructed end 55 of each pin joint assembly 31a, 31b.

Typically, the actuator 50 is installed in the wing 3 prior to assembly of the wing tip device 20. The actuator 50 undergoes various system tests to ensure it is operating correctly. The main wing portion 10 and wing tip device 20 are then shipped separately for final assembly to the aircraft 1. The main wing portion 10 is attached to the fuselage 4 of the aircraft 1, and then the wing tip device 20 is attached to the wing 3. To attach the wing tip device 20 to the main wing portion 10, the actuator 50 is removed from the wing 3, the headed pins 62 are inserted through the pin holes 31, and the actuator 50 is refitted to the wing assembly. System testing then needs to be repeated to ensure operability of the actuator 50.

The invention may be configured to mitigate one or more of the disadvantages of the existing pin joint assembly 30 shown in FIGS. 3 and 4.

Figure 5:
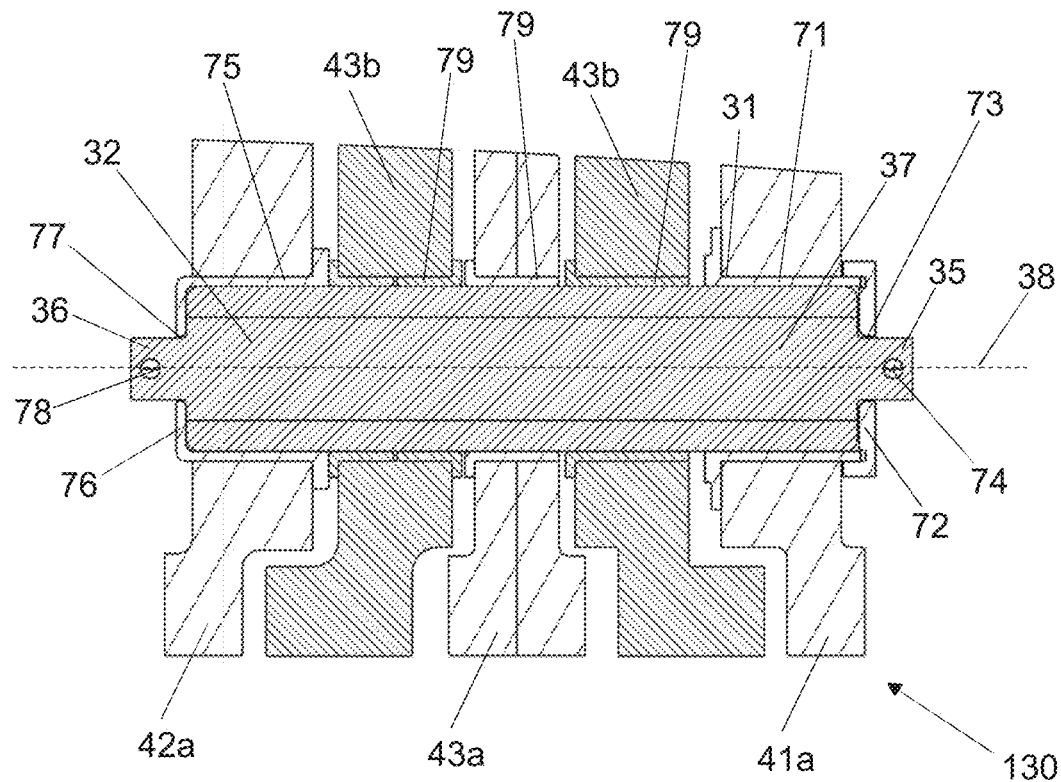
FIG. 5 shows an example of a pin joint assembly of an embodiment of the present invention.

FIG. 5 shows an example of a pin assembly 130 according to the present invention.

A pin joint assembly 130 of the present invention comprises a first end lug 41a and a second end lug 42a. The first end lug 41a and the second end lug 42a comprise a pin hole 31 that extends through the first and second lugs 41a, 42a.

A headless pin 32 may be insertable into a pin hole 31 to rotatably couple a first end lug 41a and a second end lug 42a together. In this context, a headless pin refers to a pin 32 with a pin body 37 having a maximum diameter substantially the same as the diameter of the pin hole 31 in which it is to be inserted.

In the example shown in FIG. 5, the pin joint assembly 130 includes three intermediate lugs 43a, 43b between the first and second end lugs 41a, 42a, although it will be understood that there may be any number of intermediate lugs 43a, 43b, for example one, two or four intermediate lugs 43a, 43b, or there may be no intermediate lugs.

The headless pin 32 comprises a pin body 37. The headless pin 32 may comprise a first pin end portion 35 and a second pin end portion 36 extending from opposing ends of the pin body 37, wherein the pin body 37 has a diameter larger than the first pin end portion 35 and the second pin end portion 36.

The pin joint assembly 130 may be applicable to a wide range of applications. In the example shown in FIG. 5, the pin joint assembly 130 is part of an aircraft assembly arranged between a main wing portion 10 and a wing tip device 20. The first end lug 41a, second end lug 42a, and mid-intermediate lugs 43a extend from the main wing portion 10, and the remaining intermediate lugs 43b extend from the wing tip device 20. However, it will be appreciated that any suitable arrangement of lugs 41a, 42a, 43a, 43b may be provided, with the end lugs 41a, 42a alternatively extending from the wing tip device 20, or each end lug 41a, 42a extending from a respective one of the main wing portion 10 and wing tip device 20.

In an alternative example, the pin joint assembly may be arranged between any other suitable components. For example, the pin joint assembly may be arranged to provide relative rotation between a main wing portion 10 and a flight control surface, such as a slat 12, an aileron 13, a spoiler/brake 14, or a flap 15.

To provide a bearing surface between the rotating components, a bushing 71, 75, 79 is positioned between each lug 41a, 42a, 43a, 43b and the headless pin 32.

A first bushing 71 may be positioned between the headless pin 32 and the first end lug 41a. A first retaining feature in the form of a first bushing cap 72 may be positioned over the first pin end portion 35 such that the first bushing cap 72 can be brought into contact with the first bushing 71. The first bushing cap 72 may include an aperture 73 for the first pin end portion 35 to pass through. A first pin retainer 74 may be attached to the first pin end portion 35 to retain the first bushing cap 72 between the first pin retainer 74 and the pin body 37. The first bushing cap 72 may overlap a portion of the first bushing 71, such as the overlap indicated in FIG. 6 by arrow 81.

The diameter of the first bushing cap 72 may be greater than the diameter of the pin body 37. The diameter of the first bushing cap 72 may be greater than the diameter of the first bushing 71. The first bushing cap 72 may be a locking bushing arranged to lock to the first bushing 71 and substantially prevent removal of the first bushing cap 72 from the first bushing 71. For example, the first bushing cap 72 may comprise a slot 83 arranged to interference fit with a portion of the first bushing 71 so as to fixedly attach the first bushing cap 72 to the first bushing 71, or the first bushing cap 72 may comprise a threaded portion arranged to attach to a corresponding threaded portion on the first bushing 71. A tab washer (not shown) may be positioned between the first bushing cap 72 and the first bushing 71 to prevent vibration loosening the respective parts from each other. In this example, the pin retainer 74 may function as a failsafe, in the event that the first bushing cap 72 is forced away from the first bushing 71, to ensure that the headless pin 32 is retained in the pin hole 31.

A second bushing 75 may be positioned between the headless pin 32 and the second end lug 42a. A second retaining feature is provided in the form of a second bushing cap 76 that is integral with the second bushing 75 so as to form a single unitary bushing. The second bushing cap 76 may include an aperture 77 for the second pin end portion 36 to pass through. A second pin retainer 78 may be attached to the second pin end portion 36 to retain the second bushing cap 76 between the second pin retainer 78 and the pin body 37.

An intermediate bushing 79 may be positioned between each intermediate lug 43a, 43b and the headless pin 32.

The pin hole 31 has a pin axis 38. The headless pin 31 is rotatable about the axis. The pin end portions 35, 36 and pin body 37 may be circular in cross-section and share a common central axis. The central axis of the headless pin 31 is substantially co-axial with the pin axis 38 when the pin assembly 130 is assembled.

Figure 6:
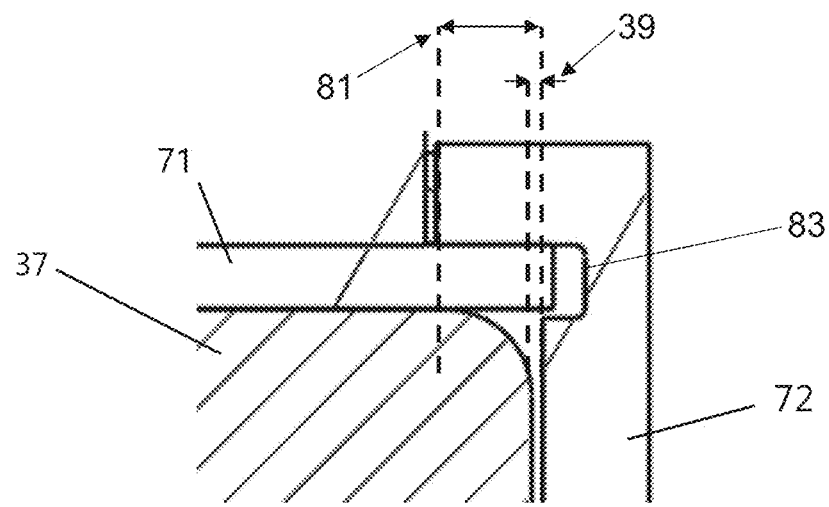
FIG. 6 shows a detailed view of a part of the pin joint assembly.

The headless pin 32 is not clamped between the bushing caps 72, 76, and so the headless pin 32 may be freely rotatable with respect to each of the lugs 41a, 42a, 43a, 43b. To achieve this, a gap 39 is provided between the pin body 37 and either or both of the bushing caps 72, 76, as shown in FIG. 6. The gap 39 is provided by providing the pin body 37 with a length, when measured along the pin axis 38, less than the distance between the first and second bushing caps 72, 76, when measured along the pin axis 38. The gap 39 may be any suitable size, although is typically small enough to prevent any significant axial movement of the headless pin 32.

As a result, the function of the headless pin 32 is isolated from the lugs 41a, 42a, 43a, 43b to create a dual slip path. The advantage of a dual slip path is that if one slip path becomes damaged or restricted in some manner, the second slip path is able to compensate and prevent inoperability and/or damage to the assembly 130.

In contrast, the existing pin assembly 130 described in relation to FIGS. 3 and 4 clamps the end bushing 63a to the pin sleeve 61, which is itself at least partially clamped to the headed pin 62, using a set of locking features 67, such that there is only a single slip path between the headed pin 62 and the end lugs 41a, 42a. This also means that the end lugs 41a, 42a of the existing pin assembly 130 must extend from the same component, otherwise the headed pin 62 would clamp the two components together, whereas the pin assembly of the present invention may have any arrangement of lugs 41a, 42a, 43a, 43b such that the first end lug 41a may extend from a first component and the second end lug 42a may extend from a second component.

In an alternative example, the degree of rotation of the headless pin 32 may be partially limited with respect to each of the lugs 41a, 42a, 43a, 43b, such that the rotation of the headless pin 32 relative to one or more of the lugs 41a, 42a, 43a, 43b is limited to a predetermined angular range.

The pin retainers 74, 78 substantially prevent axial movement of the movement of the headless pin 32 relative to the respective bushing caps 72, 76, whilst providing no clamping force such that the axial force transferred from the first and second bushing caps 72, 76 to the pin body 37 is substantially zero. In some examples the pin retainers 74, 78 may physically contact the pin body 37, but are not arranged to compress the pin body 37 to produce an axial stress through the pin body 37. In some examples, a physical gap may be present between the pin retainers 74, 78 and the pin body 37. The gap may be 1 mm or less, or 0.5 mm or less, although the gap will depend on the size of the pin joint assembly.

Figure 7A:
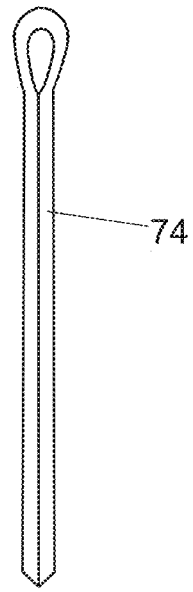
FIG. 7A shows a split pin.
Figure 7B:
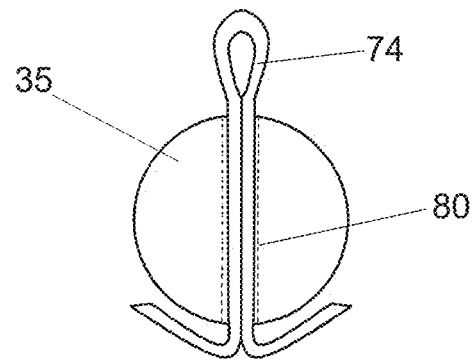
FIG. 7B shows a split pin in an assembled configuration.

The first and second pin retainers 74, 78 may be split pins inserted into a through-hole 80 in the first and second pin end portions 35, 36 respectively. FIG. 7A shows an example of a split pin. A split pin may have a pair of tines, wherein one of the tines is bent during installation to fix the split pin in position. FIG. 7B shows a split pin 74 inserted through a through-hole 80 in the first pin end portion 35.

Figure 7C:
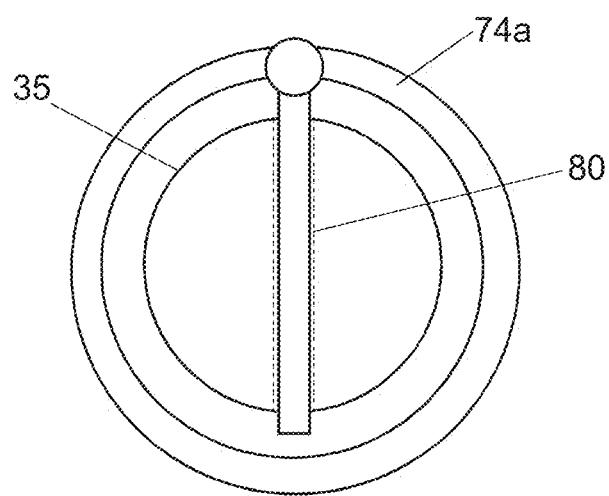
FIG. 7C shows a locking pin in an assembled configuration.

In alternative examples, the pin retainers 74, 78 may comprise any suitable fastener arrangement. For example, one or both of the pin retainers 74, 78 may be a locking pin, a pair of opposing nuts, or a circlip. FIG. 7C shows a locking pin 74a inserted through a hole 80 in the first end portion 35.

The advantage of split pins 74 and locking pins 74a is that they are easy and quick to assemble and disassemble.

As no clamping force is required to clamp the headless pin 32 to the end lugs 41a, 42a, the pin retainers 74, 78 can be much smaller in comparison to the required size of the set of locking features 67 of the headed pin 62 described in relation to FIGS. 3 and 4. The length of the headless pin 32 can also be reduced. Consequently, this restores the space available for systems and structure adjacent the pin assemblies 130a, 130b, and may provide more design freedom for deciding the direction in which the pin 32 is inserted into the pin hole 31.

Figure 8:
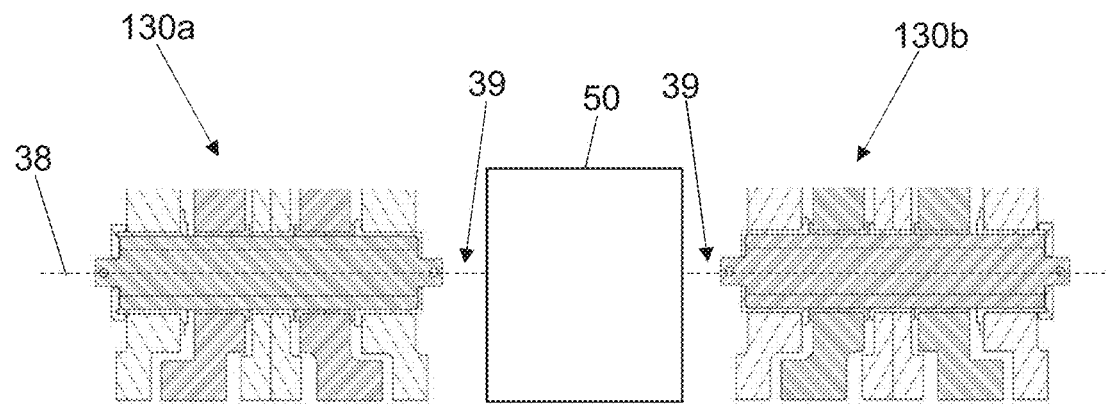
FIG. 8 shows an aircraft assembly including a pair of the pin joint assemblies of FIG. 6.

FIG. 8 schematically shows an actuator 50 positioned between a pair of pin assemblies 130a, 130b according to an example of the present invention, although it will be clear that the actuator 50 may be any obstruction that defines an obstructed end 39 of the pin assemblies 130a, 130b by impeding or restricting removal of the headless pins 32 from the obstructed end 39.

The pair of pin assemblies 130a, 130b may be arranged with a first pin joint assembly 130a adjacent a trailing edge of a wing 3 and a second pin joint assembly 130b adjacent the leading edge of the wing 3. The pin joint assemblies 130a, 130b may be arranged such that, for the first pin joint assembly 130a, the headless pin 32 is inserted from the trailing edge of the wing 3 towards the middle of the wing 3, and for the second pin joint assembly 130b, the headless pin 32 is inserted from the leading edge of the wing 3 towards the middle of the wing 3.

As a result, assembly or disassembly of the headless pins 32 from the pin joint assemblies 130a, 130b is away from the centre of the wing box. If an actuator 50 is installed prior to the assembly of the headless pins 32 of the pin joint assemblies 130a, 130b, the headless pins 32 can be inserted without requiring the actuator 50 to be disassembled. This prevents the need for further system testing of the actuator 50 that is otherwise required if the actuator 50 is removed then subsequently reintroduced. As a result, plug and play functionality of the components connected to the pin joint assembly 130 may be provided without having to breakdown non-related systems.

Whilst the aircraft assembly is shown with the headless pin 32 of the first pin joint assembly 130a inserted from the trailing edge of the wing 3 towards the middle of the wing 3, and with the headless pin 32 of the second pin joint assembly 130b inserted from the leading edge of the wing 3 towards the middle of the wing 3, it will be clear that the headless pin 32 of either first or second pin joint assemblies 130a, 130b may be inserted from the opposing side if the integral second bushing 75 and second bushing cap 76 are provided on the opposing end of the respective pin joint assembly 130a, 130b.

Figure 9:
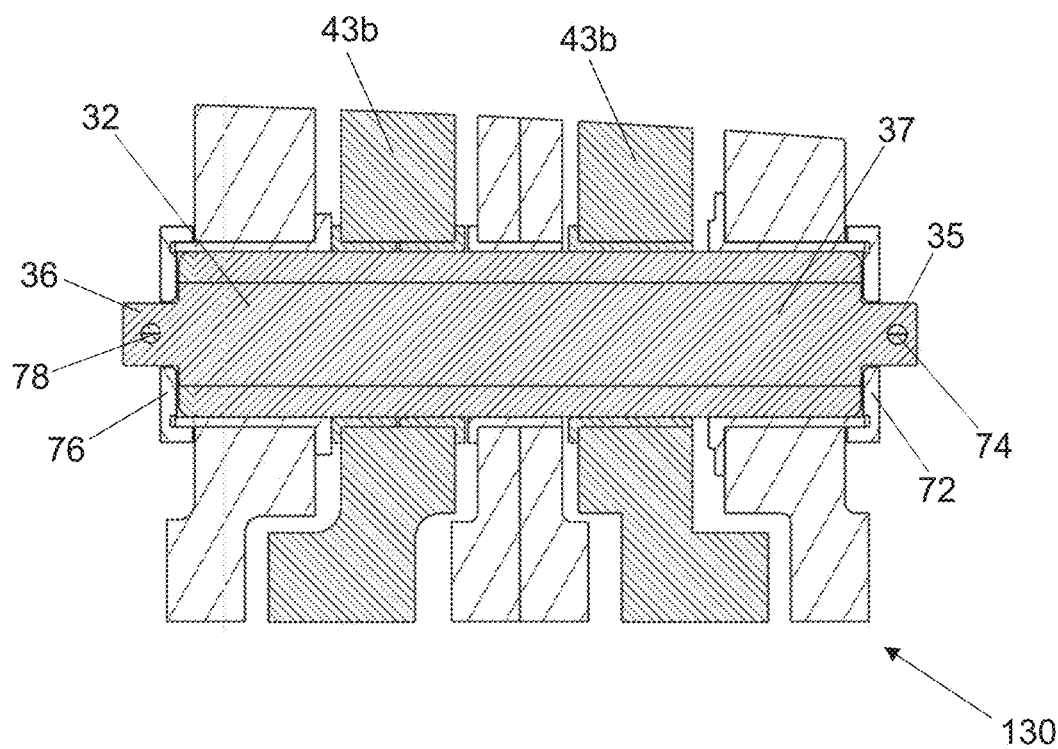
FIG. 9 shows a further example of a pin joint assembly of the present invention.

Alternatively, the second bushing 75 may be separate to the second bushing cap 76, such that the headless pin 32 may be insertable from either end of the pin assembly 130. An example in which the second bushing 75 is separate to the second bushing cap 76 is shown in FIG. 9. This arrangement allows the first bushing cap 72 to be removed so that the headless pin 32 is insertable and removable from a first end of the pin joint assembly 130, and further allows the second bushing cap 76 to be removed so that the headless pin 32 is also insertable and removable from a second end of the pin joint assembly 130 that opposes the first end.

The second bushing cap 76 may be substantially the same as the first bushing cap 72. The second bushing cap 76 may be a locking bushing arranged to lock to the second bushing 75 and substantially prevent removal of the second bushing cap 76 from the second bushing 75.

In some examples, the headless pin 32 may not include a first pin end portion 35 or a second pin end portion 36, and the first and second bushing caps 72, 76 may not include an aperture 73, 77, such that the headless pin 32 is retained within the pin hole 31 by the first and second bushing caps 72, 76.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pin joint assembly comprising:
   a first end lug;
   a second end lug;
   a pin hole extending through the first end lung and the second end lug;
   a first retaining feature at a first end of the pin hole;
   a second retaining feature at a second end of the pin hole, opposite to the first pin hole;
   a headless pin comprising a pin body configured to be inserted through the pin hole to rotatably couple the first and second end lugs, such that the pin body is retained between the first retaining feature and the second retaining feature;
   a first bushing configured to be positioned between the headless pin and the first end lug, and
   a second bushing configured to be positioned between the headless pin and the second end lug;
   wherein the headless pin is isolated from at least the first retaining feature.

2. The pin joint assembly of claim 1, wherein the first retaining feature is fixed to the first bushing.

3. The pin joint assembly of claim 1, wherein the second retaining feature is integral with the second bushing.

4. The pin joint assembly of claim 1, wherein the pin body is rotatable with respect to both the first end lung and the second end lug.

5. The pin joint assembly of claim 1, wherein the headless pin comprises:
a first pin end portion at a first end of the pin body, and wherein the first pin end portion is configured to pass through an aperture formed in the first retaining feature, and
a first pin retainer is configured to attach to the first pin end portion to retain the first retaining feature between the first pin retainer and the pin body.

6. The pin joint assembly of claim 1, wherein the headless pin comprises:
a second pin end portion at a second end of the pin body, and wherein the second pin end portion is configured to pass through an aperture formed in the second retaining feature, and
a second pin retainer is configured to attach to the second pin end portion to retain the second retaining feature between the second pin retainer and the pin body.

7. The pin joint assembly of claim 6, wherein the first pin retainer and/or the second pin retainer is a locking pin or a split pin.

8. The pin joint assembly of claim 6, wherein the first pin end portion and the second pin end portion are integrally formed with the pin body.

9. The pin joint assembly of claim 1, wherein the first retaining feature is a locking bushing cap configured to fixedly attach to the first bushing and/or the second retaining feature is a locking bushing cap configured to fixedly attach to the second bushing.

10. The pin joint assembly of claim 1, comprising at least one intermediate lugs between the first end lung and the second end lug, wherein the pin hole extends through the at least one intermediate lugs.

11. The pin joint assembly of claim 1, wherein at least two of the first end lug, the second end lug, and the at least one intermediate lugs extend from a common component.

12. An aircraft assembly comprising:
the pin joint assembly of claim 1,
a first aircraft component, and
a second aircraft component,
wherein the first end lug extends from one of the first aircraft component or the second aircraft component, and the second lug extends from one of the first aircraft component or the second aircraft component, such that the first aircraft component is arranged to rotate relative to the second aircraft component about an axis of the pin joint assembly.

13. The aircraft assembly of claim 12, wherein the first aircraft component is a main wing portion of a wing, and the second aircraft component is a wing tip device.

14. The aircraft assembly of claim 13, wherein the second aircraft component is a folding wing tip device configured to rotate relative to the main wing portion about a fold axis that extends from a leading edge to a trailing edge of the wing.

15. The aircraft assembly of claim 12, wherein the first aircraft component is a main wing portion of a wing and the second aircraft component is a flight control surface.

16. The aircraft assembly of claim 15, wherein the flight control surface is one of: an aileron, a slat, a spoiler, and a flap.

17. The aircraft assembly of claim 12, further comprising an obstruction arranged at an obstructed end of the pin hole.

18. The aircraft assembly of claim 17, wherein the obstruction is an actuator configured to rotate the second aircraft component relative to the first aircraft component.

19. The aircraft assembly of claim 17, wherein the pin joint assembly is a first pin joint assembly, and
further comprising a second pin joint assembly,
wherein the obstruction is arranged at the obstructed end of the first pin joint assembly and at an obstructed end of the second pin joint assembly.

20. A pin joint assembly comprising:
a first end lug including a first pin hole;
a first bushing in the first pin hole;
a second end lug including a second pin hole;
a second bushing in the second pin hole;
an intermediate lug between the first end lug and the second end lug, wherein the intermediate lug includes a third pin hole;
a headless pin including a pin body extending through the first pin hole, the second pin hole and the third pin hole, wherein the headless pin rotatably couples the intermediate lug to both the first end lug and the second end lug;
a first bushing cap fixed to an end of the first bushing and covering a first end of the headless pin;
a second bushing cap fixed or integral with an end of the second bushing and covering a second end of the headless pin; and
a gap separating at least one of (i) the first bushing cap from the first end of the headless pin, or (ii) the second bushing cap from the second end of the headless pin,
wherein the headless pin is isolated from at least one of the first bushing cap or the second bushing cap.

21. A method of assembling a pin joint assembly, the method comprising:
providing a first end lug and a second end lug with a pin hole extending through the first end lug and the second end lug;
providing a headless pin comprising a pin body;
inserting the headless pin into an open end of the pin hole that opposes an obstructed end of the pin hole, wherein the headless pin in the pin hole rotatably couples the first end lug to the second end lug;
providing a first retaining feature and a second retaining feature arranged at opposing ends of the pin hole such that the pin body is retained between the first and second retaining features; and
providing a first bushing positioned between the headless pin and the first end lug, and a second bushing positioned between the headless pin and the second end lug;
wherein the headless pin is isolated from at least one of the first retaining feature or the second retaining feature.

* * * * *